Dec. 16, 1930. R. S. BURDETTE 1,785,691
TIRE FLAP
Filed April 17, 1928

Inventor
Richard S. Burdette.
By
Attorney

Patented Dec. 16, 1930

1,785,691

UNITED STATES PATENT OFFICE

RICHARD S. BURDETTE, OF AKRON, OHIO, ASSIGNOR TO THE GOODYEAR TIRE & RUBBER COMPANY, OF AKRON, OHIO, A CORPORATION OF OHIO

TIRE FLAP

Application filed April 17, 1928. Serial No. 270,665.

This invention relates to pneumatic tires, and it has particular relation to a flap which normally is interposed between the inner tube of a tire and the tire rim of a vehicle wheel.

The object of the invention is to provide a tire flap so constructed and treated that it will not adhere objectionably to the rim of the vehicle wheel upon which it is employed.

In the operation of pneumatic tires, it is ordinary practice to protect the inner tube of the tire by the employment of a flap between the tube and the rim of the vehicle wheel. The flaps generally employed are constructed of rubber compound or rubberized fabric. During the operation of the tire, however, moisture frequently reaches the base of the rim and causes oxidation thereof, resulting in adhesion of the flap to the rim. This renders difficult the removal of the tire from the rim.

According to this invention, this disadvantage is obviated by coating the side of the flap next to the rim, with a material which serves to prevent adhesion of the flap to the rim. One form of the invention contemplates the employment of a material of such nature that it will perform its function regardless of whether or not it is exposed to moisture.

For a better understanding of the invention, reference may now be had to the accompanying drawings, forming a part of this specification, in which.

Figure 1:
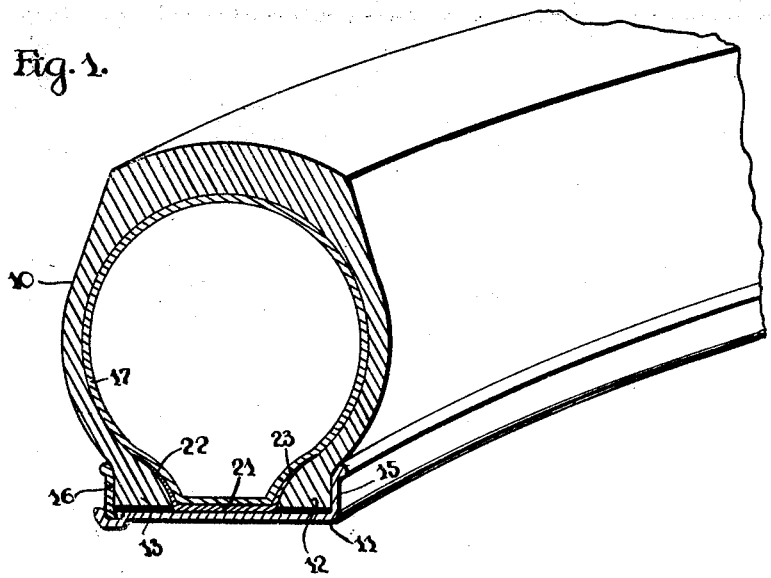
Figure 1 is a cross-sectional and perspective view of a portion of a tire and rim, having a flap installed in conjunction therewith.

Referring to Figure 1, a pneumatic tire 10 is shown supported upon the rim 11 of a vehicle wheel. The tire is of ordinary construction and is maintained upon the rim by the flanges 15 and 16 of the rim which engage conventional beads 12 and 13.

An inner tube 17, when inflated, presses the flap between the beads 12 and 13 of the tire and against the base of the rim. In removing tires from rims of this type, it is the practice to remove the flange 16 and then slide the tire laterally across the base of the rim. Consequently, it is apparent that any adhesion of the flap to the rim strongly opposes the removal of the tire.

Figure 2:
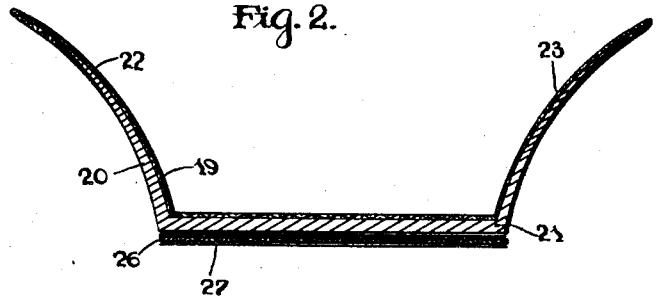
Figure 2 is a cross-sectional view, on a larger scale, of a flap constructed according to one form of the invention.

In the embodiment of the invention shown by Figure 2, the flap comprises a layer of flannel 19, reinforced by rubberized fabric 20, and is formed to provide a base 21 and the side portions 22 and 23. A strip 26 of flannel, preferably having its exposed surface napped, so that a paint 27, or like material, will adhere readily thereto, is cemented or otherwise secured to the base 21. This paint 27 is of such character that it prevents sticking of the flap to the rim.

Preferably, this material consists of an unoxidizable lubricant such as flake or powdered graphite, mixed with a binder, such as hard soap, in aqueous solution. This results in a paintlike material referred to, which can be applied directly to the strip of flannel 26. After being applied to the flap, the mixture dries to a certain extent and remains thereon unless acted upon by moisture, in which case, the graphite is mechanically freed sufficiently to prevent sticking of the flap to the rim.

Figure 3:
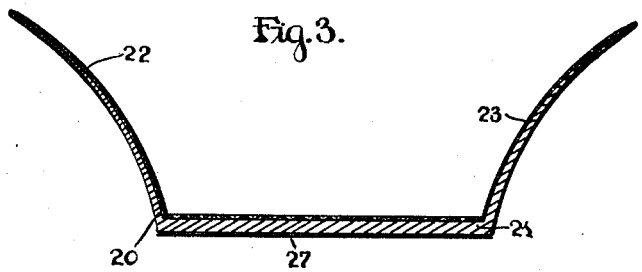
Figure 3 is a cross-sectional view, on a larger scale, of a flap constructed according to another form of the invention.

According to the form of the invention shown by Figure 3, the strip of napped flannel 26 is omitted, and the paint 27 is applied directly to the surface of the base 21.

From the foregoing description, it will be apparent that a flap constructed according to this invention will aid materially in preventing sticking of the flap to the rim with which it is utilized, and that the improved flap does not involve a material increase in the cost of manufacture thereof.

Although I have illustrated only the preferred forms which my invention may assume and have described those forms in detail, it will be apparent to those skilled in the art that the invention is not so limited but that various modifications and changes may be made therein without departing from the spirit of the invention or from the scope of the appended claims.

What I claim is:

1. A tire flap comprising a body portion, and means on the rim side of the flap to prevent adhesion of the body portion to the rim, said means comprising graphite combined with a soluble binder.

2. A tire flap comprising a body portion, a layer of fabric on the rim side of the body portion, and means on the outer side of the fabric to prevent adhesion of the body portion to the rim of a vehicle wheel, said means including graphite combined with a soluble binder.

3. A tire flap comprising a body portion, a layer of fabric on the rim side of the body portion, and means on the outer side of the fabric to prevent adhesion of the fabric to the rim of a vehicle wheel, said means including graphite combined with soap.

In witness whereof, I have hereunto signed my name.

Signed at Akron, in the county of Summit, and State of Ohio, this 16th day of April, 1928.

RICHARD S. BURDETTE.